(12) United States Patent
Rael et al.

(10) Patent No.: US 9,163,389 B2
(45) Date of Patent: Oct. 20, 2015

(54) TOILET SEALING RING

(75) Inventors: Raymond Toby Rael, Council Bluffs, IA (US); Hayat El-Khoury, Middleburg Heights, OH (US); Amrit Parhar, Westlake, OH (US); Forest Hampton, III, Elyria, OH (US)

(73) Assignee: OATEY COMPANY, Cleveland, OH (US)

( * ) Notice: Subject to any disclaimer, the term of this patent is extended or adjusted under 35 U.S.C. 154(b) by 921 days.

(21) Appl. No.: 13/330,866

(22) Filed: Dec. 20, 2011

(65) Prior Publication Data

US 2012/0174305 A1 Jul. 12, 2012

Related U.S. Application Data

(60) Provisional application No. 61/428,270, filed on Dec. 30, 2010.

(51) Int. Cl.
*E03D 11/16* (2006.01)
*C08L 91/06* (2006.01)

(52) U.S. Cl.
CPC ............... *E03D 11/16* (2013.01); *C08L 91/06* (2013.01)

(58) Field of Classification Search
CPC ....................................................... E03D 11/16
USPC ................................................ 4/252.1–252.6
See application file for complete search history.

(56) References Cited

U.S. PATENT DOCUMENTS

| 3,400,411 | A | * | 9/1968 | Harvey .......................... 4/252.6 |
| 3,821,820 | A | | 7/1974 | Thompson |
| 4,130,618 | A | | 12/1978 | Hill |
| 4,377,649 | A | | 3/1983 | Sweeney et al. |
| 4,456,649 | A | | 6/1984 | Clarke |
| 5,837,763 | A | | 11/1998 | Ferraro et al. |
| 6,485,553 | B1 | | 11/2002 | Guinn |
| 6,534,573 | B1 | | 3/2003 | Mace et al. |
| 6,691,331 | B2 | | 2/2004 | Gallacher et al. |
| 7,240,378 | B2 | | 7/2007 | Long et al. |
| 7,671,122 | B2 | | 3/2010 | Odajima et al. |
| 2004/0128752 | A1 | | 7/2004 | Atkins et al. |

OTHER PUBLICATIONS

Esso Imperial Oil Product Data Sheet, "Slack Wax Wood Panel Sizing Agent and Finished Wax Feed Stock," Aug. 2002, 3 pages.
Website printout of Distributor of Slack Wax, http://www.slack-wax.com/, printed Nov. 15, 2010.
Website printout of Hase Petrolelum Wax Co., Wax Product List, Slack Unrefined/Recycled Waxes; htpp://www.hpwax.com/slack_wax.htm, printed Nov. 15, 2010, 1 page.
Website printout from Encyclopedia of Waxes; http://www.candlecauldron.com/waxandwicks.html, printed Nov. 15, 2012, 4 pages.
Office Action from Canadian Patent Application No. 2,762,659 dated Nov. 1, 2013.

* cited by examiner

*Primary Examiner* — Lori Baker
(74) *Attorney, Agent, or Firm* — Baker & Hostetler LLP

(57) ABSTRACT

A toilet sealing ring for sealing the outlet of a floor mounted toilet to a mating drain pipe comprises an annular mass of a wax based composition comprising a wax component and at least 20 wt. % of a non-wax filler component.

23 Claims, 1 Drawing Sheet

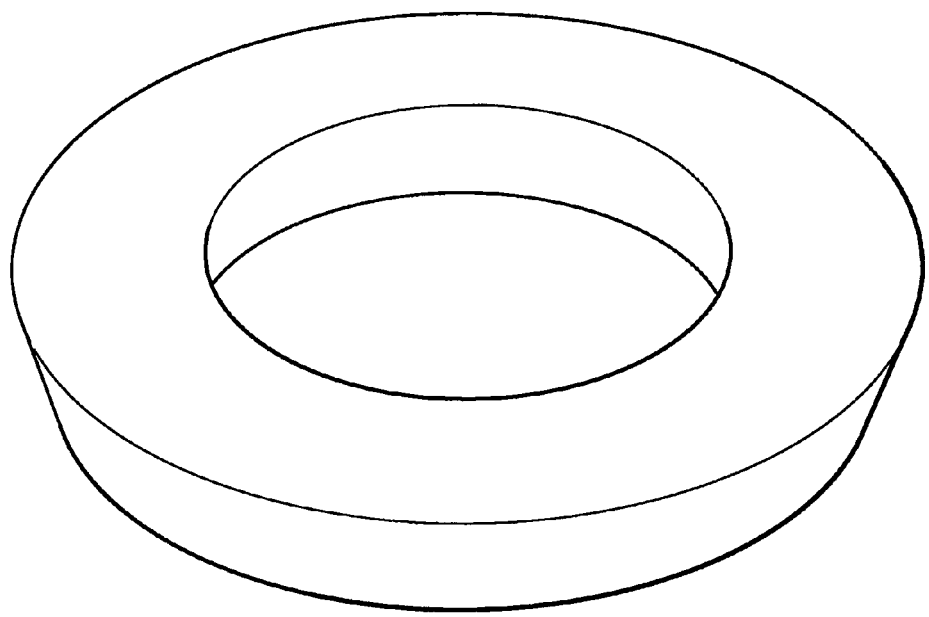

TOILET SEALING RING

CROSS-REFERENCE TO RELATED APPLICATION

This application claims the benefit of U.S. Provisional Patent Application Ser. No. 61/428,270, entitled "TOILET SEALING RING filed Dec. 30, 2010, the entire contents of which are incorporated herein by reference, to the extent that they are not conflicting with the present application.

BACKGROUND

Conventional toilet sealing rings for sealing the outlet channel of a floor mounted toilet to an upwardly facing drain are commonly made from slack wax. As well known, slack wax is a crude petroleum based wax obtained by chilling and solvent-filter pressing wax distillate. It is commercially available in a variety of different grades. The wax used to make conventional toilet sealing rings is normally formed from two to four of these grades, combined to achieve a wax blend exhibiting a desired combination of melting point, hardness and elasticity.

Because of refinements in refining technology, slack wax is becoming increasingly less available and hence more expensive. Accordingly, it would be desirable to develop alternatives to the slack wax blends currently used for making conventional toilet seat rings to reduce the amount of slack was required without sacrificing performance.

SUMMARY

In accordance with this invention, novel toilet sealing rings are made from a wax-based composition containing both high density and low density fillers. A small but suitable amount of a low density polyethylene wax is optionally but desirably included in the system for aiding homogeneous distribution of these fillers in the wax and also for improving processability. The result is a new wax composition which is less costly to make than, yet still provides the same performance as, the slack wax blends currently used for making conventional toilet sealing rings.

Thus, this invention provides a novel toilet sealing ring for sealing the junction between the downwardly facing outlet of a floor mounted toilet and the mating upwardly facing inlet of a drain pipe received in the floor, the drain pipe having an outside diameter of about 2 to 6 inches (about 5 to 15 cm), the toilet sealing ring comprising an annular mass of a wax based composition comprising a wax component and at least 20 wt. % of a non-wax filler component, the percent being based on the weight of the wax based composition as a whole, the annular mass having an inside diameter, an outside diameter and a thickness sufficient so that the toilet sealing ring forms a fluid tight seal between the toilet outlet and the drain pipe inlet when the toilet is mounted in position on the floor.

In addition, this invention also provides a wax based composition for making a toilet sealing ring, the composition comprising at least about 20 wt. % of a high density filler having a density of at least about 1.5 g/cc, at least about 3 wt. % of a low density filler having a density of no more than about 0.6 g/cc, and a sufficient amount of a wax component so that the wax based composition as a whole exhibits a Softening Point of about 60° C. to 90° C., a hardness of about 60 to 150 (measured using a Humboldt needle no. H-1310), and passes an Elasticity test as outlined in the Test Standard TT-P-1536 A.

DESCRIPTION OF THE DRAWING

FIG. 1 illustrates a toilet sealing ring in accordance with an embodiment.

DETAILED DESCRIPTION

In accordance with this invention, a toilet sealing ring is made from a wax-based composition containing a non-wax filler, preferably both high density and low density fillers. A small but suitable amount of a low density polyethylene wax is optionally but desirably included in the composition for aiding homogeneous distribution of these fillers in the wax and also for improving processability.

The inventive toilet sealing ring is intended for use in sealing the junction between the downwardly facing outlet of a floor mounted toilet and the mating upwardly facing inlet of a drain pipe received in the floor. Such drain pipes typically have outside diameters of about 2 to 6 inches (about 5 to 15 cm), more typically about 3 to 4 inches (about 7.6 to 10.2 cm). Therefore, the inventive toilet sealing ring will normally take the form of an annular mass of the inventive wax based composition, the annular mass having an inside diameter, an outside diameter and a thickness sufficient so that the toilet sealing ring forms a fluid tight seal between the toilet outlet and the inlet of the particular drain pipe being sealed, when the toilet is mounted in position on the floor.

Wax Component

The wax component used to make the inventive toilet sealing ring is desirably made from a petroleum derived wax. Preferably, this wax component exhibits a Drop Melt Point of about 45° C. to 125° C., when measured by ASTM D127, and a hardness of about 40 to 100, when measured by the Cone Penetration Test of ASTM D937. More preferably, the wax component exhibits a Drop Melt Point of about 55° C. to 85° C., or even 62° C. to 75° C., and a hardness of about 45 to 85, or even 55 to 70.

Essentially any petroleum derived wax can be used for formulating the wax component of this invention. For example, slack wax, paraffin wax, scale wax, microcrystalline wax, black wax, soft petroleum wax and petrolatum can be used. Mixtures of these waxes can also be used. Most desirably, slack waxes are used as they are already used for making toilet sealing rings and, in addition, are still relatively inexpensive compared to other types of waxes. Synthetic waxes can also be used, although they are less preferred, at least for use as the primary wax component of the inventive wax based composition, for reasons of cost and hardness.

One example of a particular wax which is useful for this invention is Sasol S9451, which is a slack wax available from Sasol Wax North America of Richmond, Ca., which exhibits a needle penetration (ASTM D937) of 98 dm, a softening point of 158° F. (70° C.) and density of 7.5 lbs/gal (0.90 g/cc), and which passes the Elasticity test outlined in the Test Standard TT-P-1536 A. Another specific wax which is useful in this invention is MR 5844H2, which is a slack wax available from Masterbank America Inc. of Newport Beach, Ca., which exhibits a Drop Melt Point (ASTM D 127) of about 162° F. (72.2° C.), a Congeal Point (ASTM D 938) of about 145° F. (62.8° C.), a Cone Penetration at 77° F. (25° C.) (ASTM D 937) of about 80, and a viscosity at 100° C. (ASTM D 445) of about 16 cSt (centistokes). Still another specific wax which is useful in this invention is PETROFIBE® 0284A, which is a high melt, unrefined petrolatum having a Drop Melt Point (ASTM D 127) of about 178° F. (about 81° C.) and a kinematic viscosity at 212° F. (100° C.) of about 34 cSt, available from The International Group of Toronto, Canada. Additional examples of particular waxes which are useful for this invention include MR 7440 and MR4940, which are components of MR 5844H2, also available from Masterbank America Inc., and Micronized wax 200, 300 and 500, which are polyethylene waxes available from Marcus Oil and Chemical Company.

Non-petroleum based waxes such as animal waxes and plant derived waxes could also be used, e.g., beeswax, palm wax, castor wax and soybean wax, but are desirably avoided, since waxes and oils derived from plants and animals are known to cause stress cracking of certain plastic pipes.

Hydrocarbon Oil

In some embodiments of this invention, it may be desirable to include a hydrocarbon oil in the wax component in order to achieve the appropriate combination of Drop Melt Point and hardness, as discussed above. In this context, "hydrocarbon oil" means any composition that is liquid at 15° C. and one atmosphere pressure and, in addition, which is formed primarily of hydrocarbons. Compositions containing at least about 75 wt. %, hydrocarbons are more desirable, while those containing at least about 85 wt %, at least about 90 wt. %, at least about 95 wt. % are even more desirable. Those composed essentially completely of hydrocarbons are especially interesting. Hydrocarbon oils serve as diluents for the wax, making it possible to reduce the hardness of the final wax-based composition of this invention to the value desired.

Essentially any hydrocarbon oil can be used for formulating the wax component of this invention. Naphthenic oils as well as "processing oils," which are a well known class of hydrocarbon oils commonly used for processing rubber, are advantageously used for this purpose because they are readily available and inexpensive. Diesel fuel, coal tar and foots oil, which is a petroleum byproduct from the manufacture of high quality wax typically having pour points of 10° C. to 25° C. and kinematic viscosities of 6 to 30 cSt, can also be used.

Specific examples of useful hydrocarbon oils include L-100 Naphthenic Oil available from Cross Oil Refining and Marketing, Inc. of Smackover, Ark.; PETROFIBE® 0205A, which is a low cost waxy oil comprising a mixture of soft petroleum waxes and hydrocarbon oil having a pore point of about 100° F. (37° C.) and a kinematic viscosity at 212° F. (100° C.) of about 6 cSt. available from The International Group; and PETROFIBE® 0211A, which is a very soft microcrystalline foots oil having a pore point of about 80° F. (27° C.) and a kinematic viscosity at 212° F. (100° C.) of about 22 cSt. also available from The International Group.

While these hydrocarbon oils can have essentially any combination of properties, those exhibiting a viscosity of about 4 to 400 cSt at 100° F. (37.8° C.), a specific gravity of about 0.8 to 0.95 g/cc at 15.6° C. and an Aniline Point of 60° C. to 100° C. are more desirable. Those hydrocarbon oils exhibiting a viscosity of about 10 to 100 cSt at 100° F. (37.8° C.), a specific gravity of 0.85 to 0.93 g/cc at 60° F. (15.6° C.) and an Aniline Point of 65° C. to 90° C. are preferred, while those hydrocarbon oils exhibiting a viscosity of 18 to 30 cSt at 100° F. (37.8° C.), a specific gravity of 0.90 to 0.91 g/cc at 60° F. (15.6° C.) and an Aniline Point of 70° C. to 80° C. are even more preferred.

As in the case of the wax component, animal and vegetable derived oils such as tall oil, linseed oil, castor oil and beef tallow should also be avoided due to the risk of inducing stress cracking in certain plastic pipes, e.g., ABS.

In a convenient embodiment of this invention, the wax component of the inventive wax based composition is made by combining a slack wax having a Drop Melt point of about 130-200° F. (54.5 to 93.3° C.) and a Cone Penetration of about 40-90 dmm with a hydrocarbon oil having a viscosity of about 10 to 1,500 Cst at 100° F. (37.8° C.), a specific gravity of about 5 to 40 lbs/gal. (0.60 to 4.8 g/cc) at 60° F. (15.6° C.) and an aniline point of about 140 to 240° F. (60 to 115.6° C.). In an even more interesting embodiment of this invention, a slack wax having a Drop Melt point of about 155-175° F. (68.3 to 79.4° C.) and a Cone Penetration of about 55-70 dmm is used in combination with a hydrocarbon oil having a viscosity of about 20 to 1,000 cSt at 100° F. (37.8° C.), a specific gravity of about 15 to 25 lbs/gal. (1.8 to 3.0 g/cc) at 60° F. (15.6° C.) and an aniline point of about 160-200° F. (71.1 to 93.3° C.).

The function of the wax component of the inventive wax based composition is to serve as a carrier for the high density and low density fillers included in the inventive wax composition. In addition, a further function of the wax component is to provide the necessary flexibility, elasticity, cohesiveness and adhesiveness so that a sealing ring made from the inventive wax based composition forms a fluid tight seal between the toilet outlet channel and mating floor drain when the toilet is mounted to the floor. Therefore, the types and relative amounts of wax or waxes and hydrocarbon oils selected to formulate the wax component of a particular wax-based composition of this invention, as well as the amount of wax component included in this wax-based composition, should be selected to accomplish this function.

With respect to amount, this means that the inventive wax based composition will normally contain at least about 20 wt. % wax component, since smaller concentrations of wax component will ordinarily be insufficient to provide a coherent sealing ring with the necessary strength, flexibility, cohesiveness and elasticity. More typically, the inventive wax based composition will contain at least about 25 wt. % wax component, at least about 30 wt. % wax component, or even at least about 35 wt. % wax component, based on the weight of inventive wax based composition as a whole. Wax-based compositions containing at least about 40 wt. %, 45 wt. % or even 50 wt. % wax component are not unusual.

In terms of maximums, there is no upper limit to the amount of wax component that can be included in the inventive wax based compositions from a technical standpoint. However, including too much wax component defeats the underlying purpose of this invention in reducing wax content. In practical terms, therefore, the inventive wax based compositions will normally contain no more than about 80 wt. % wax component, based on the weight of inventive wax based composition as a whole. Wax based compositions containing no more than about 70 wt. % wax component are more typical, while those containing no more than about 60 wt. % wax component, or even no more than about 50 wt. % wax component, are more interesting. In many embodiments, the concentration of wax component will typically be about 25-60 wt. %, more commonly about 30-50 wt. %, based on the weight of the inventive wax based composition as a whole.

With respect to the types and relative amounts of different waxes and optional hydrocarbon oils used to formulate a particular wax-based composition of this invention, the desired degree of elasticity, flexibility, cohesiveness and adhesiveness will normally be achieved if the wax component is formulated to have the properties indicated above, i.e., a Drop Melt Point of about 50° C. to 125° C., when measured by ASTM D127, and a hardness of about 40 to 100, when measured by the Cone Penetration Test of ASTM D937. However, because so many different types of hydrocarbon waxes and oils can be used to make the inventive wax-based compositions (i.e., from extremely hard waxes to low viscosity oils), and because the amount of wax component used in a particular wax-based composition of this invention can vary significantly, some routine experimentation may still be necessary in selecting the particular types and amounts of hydrocarbon waxes and oils to use in particular embodiments of this invention.

For example, some slack waxes which work perfectly well if used by themselves or with only a small amount of filler will produce product wax-based compositions which are too hard, too brittle or too crumbly if used with larger amounts (e.g., 50 wt. %) filler. If so, an additional "softer" hydrocarbon component, either a softer hydrocarbon wax such as petrolatum or a hydrocarbon oil such as L-100 or PETROFIBE® 0211A or both, should be added to achieve the softness, flexibility, cohesiveness and adhesiveness desired. In other instances, use of too much of a soft hydrocarbon wax such as petrolatum will lead to a product waxed-based composition which is too sticky or too soft (i.e., too soft to hold its shape over time) or both. If so, one or more additional harder waxes should be added to achieve the desired degree of hardness and elasticity.

In practical terms, this means that the wax component of the wax-based compositions made in accordance with this invention will normally contain not only a relatively harder (i.e., hardness of 70 or more when measured by the Cone Penetration Test of ASTM D937) wax such as slack wax but also one or more softer hydrocarbon ingredients as well, either a softer hydrocarbon wax or a hydrocarbon oil or both, to achieve the desired degree of softness, flexibility, cohesiveness and adhesiveness in the final wax-based product. Normally, therefore, the amount of harder hydrocarbon wax in the inventive wax-based compositions will be about 40 to 90 wt. %, or more commonly, about 50 to 80 wt. %, based on the weight of the wax component as a whole, with the balance being either a relatively softer wax (i.e., hardness of less than 70 when measured by the Cone Penetration Test of ASTM D937) or a hydrocarbon oil or both.

Low Density Synthetic Wax

Another desirable although optional component of the wax component of the inventive wax based composition is a low density synthetic wax. For this purpose, any synthetic wax made by polymerizing or copolymerizing ethylene and/or its closely related homologues propylene, n-butylene and iso-butylene can be used, provided that the polymerized product has a density of about 0.5 to 1.2 g/cc, preferably 0.75 to 0.95 g/cc. Preferred low density synthetic waxes also have Drop melt points of 120 to 250° F. (48.9 to 121.1° C.), preferably 180 to 200° F. (82.2 to 93.3° C.). Oxidized versions of these synthetic waxes, e.g., oxidized polyethylene was, can be also be used.

Specific examples of low density synthetic waxes that can be used for this purpose include Low density Polyethylene wax from Marcus Oil and Chemical Company of Houston, Tex. and Vestowax A118 from Evonik Degussa Corp, of Parsippany, N.J.

The primary function of the low density synthetic wax is to serve as a coupling agent, causing wax component of the inventive wax composition to adhere better to the particulate filler or fillers. In this regard, it is very difficult to maintain a substantial amount of high density filler, as well as a substantial amount of low density filler, homogeneously distributed in the same molten wax composition as the wax cools and solidifies since the densities of these two fillers are so different. In accordance with this invention, it has been found that use of a small but suitable amount of a synthetic wax will accomplish this function while simultaneously improving the chemical resistance and processability of the molten wax composition obtained. In other words, the synthetic wax also makes the physical process of forming and maintaining a homogeneous mixture of the high and low density fillers in the wax easier.

Accordingly, the amount of synthetic wax used in particular embodiments of this invention should be enough to insure that both the high density and low density fillers remain essentially homogenously dispersed in the wax based composition of this invention as it cools and solidifies. On the other hand, the amount of synthetic wax used in particular embodiments of this invention should not be so much that the final product is too sticky. Generally speaking, therefore, the amount of synthetic wax in the inventive wax based composition should be about 0.5 to 10 wt. %, based on the entire weight of the inventive wax based composition as a whole. Concentrations of about 1 to 6 wt. %, more typically 2 to 4 wt. %, are more common.

Particulate Filler

In accordance with this invention, a non-wax particulate filler is included in the wax based composition which is used to form the inventive toilet sealing ring. The basic function of this filler is to act as an extender, thereby reducing the amount of wax necessary to make this product. A secondary function of the filler is that it affects both the hardness and the density of the wax composition obtained. Any non-wax particulate which is capable of providing these functions and which remains solid at the softening temperature of the inventive wax based composition can be used for this purpose, in theory. In practical terms, only those particulates which are less expensive than the wax component they replace will be used.

Normally, this means that both high density and low density fillers will be included in the inventive wax based compositions, because this usually provides the best performance at the lowest cost. In this context, a "high density filler" will be understood to mean a filler having an average dry bulk density of at least about 1.5 g/cc, while "low density filler" will be understood to mean a filler having an average dry bulk density of no more than about 0.6 g/cc. Preferred high density fillers have average dry bulk densities of at least about 2.0 g/cc, at least about 2.25 g/cc, or even at least about 2.5 g/cc, while preferred low density fillers have average dry bulk densities of no more than about 0.6 g/cc, no more than about 0.4 g/cc, or even no more than about 0.2 Wee.

Good examples of materials which can be used as high density fillers include various naturally occurring clays such as Kaolin, bentonite, montmorillonite or modified montmorillonite, attapulgate, Buckminsterfuller's earth, etc., other naturally occurring or naturally derived materials such as mica, calcium carbonate, aluminum carbonate, various silicates such as calcium silicate, aluminum silicate, magnesium silicate, etc., various oxides such as titanium dioxide, calcium oxide, silicon dioxide (e.g., sand), various man-made materials such as precipitated calcium carbonate, precipitated silica, etc., various waste materials such as crushed blast furnace slag, etc., and the like Especially interesting high density fillers include calcium carbonate, Kaolin clays from Unimin Corporation, Dalton, Ga., precipitated silica and mica, as these materials are readily available and inexpensive.

A preferred high density filler is calcium carbonate. Calcium carbonate obtained from natural sources is typically platelet in form and is normally referred to as "ground" calcium carbonate. Calcium carbonated produced synthetically is normally referred to as "precipitated" calcium carbonate. Both types can be used as the high density filler in this invention. For best results, the calcium carbonate used, whether ground or precipitated, will have a particle size of about 2-8 microns, more typically, 3-7 microns or even 4-6 microns in its smallest dimension.

Calcium carbonate is widely used as a filler in plastics. For example, calcium carbonate is used in amounts of up to 70 phr (parts per hundred parts of resin) to improve the tensile strength, elongation and volume resistivity of polyvinyl chloride sheathing for electrical cables. In addition, calcium carbonate is also used to increase the rigidity of polypropylene and as a filler (extender) in ABS (acrylonitrile/butadiene/styrene) thermoplastic resins as well as various thermosetting resins. Calcium carbonate is a preferred high density filler for use in this invention, because it can impart a significant improvement in the mechanical properties of wax compositions in which it is contained.

Good examples of useful low density fillers include naturally occurring minerals such as pearlite, vermiculite, etc., manmade materials such as hollow microspheres and microballons made from glass, ceramics or synthetic resins such as phenolic resins, etc., fumed silica, various lightweight waste products such as ground up tires, ground up wood fibers, ground up cellulose fibers, ground up polymer foams made from a variety of different polymers including polyesters, polyamides, polystyrenes, polyurethanes, polyisocyanurates, etc., and so forth. Specific examples of suitable light weight fillers include SilCell hollow glass microspheres having a density of about 0.14 g/cc available from Silbrico of Hodgkins, Ill.; Q-Cel hollow microspheres generally having dry bulk densities on the order of about 0.10-0.48 g/cc (about 7-30 lbs/ft.$^3$) available from Potters Industries Inc, Malvern, Pa.; Fillite hollow microspheres available from Omya, UK; and Expancel expandable microspheres available from AKZO NOBEL, Duluth, Ga. Additional examples include fumed silica, polystyrene foam and ground up tires having a dry bulk density of about 0.30-0.55 g/cc (about 20-35 lbs/ft.$^3$) such as those available from Lehigh Technologies of Tucker, Ga.

In addition to high density and low density fillers, these compositions can also include medium density fillers, i.e., fillers whose densities approximate that of the wax they intend to replace. For example, such medium density fillers can have densities of from greater than about 0.6 g/cc to less than about 1.5 g/cc. Examples include various polymer resins such as polyesters, polyamides, polystyrenes, polyurethanes, polyisocyanurates, etc.

From the above, it can be seen that fillers with essentially any density can be used in formulating the wax based compositions of this invention. On the other hand, when formulating particular embodiments of the wax based composition of this invention, it is desirable to select a filler, or combinations of fillers, which in the aggregate exhibit a combined density which is approximately the same as, or only slightly less than, that of the wax being replaced, as further discussed below. This is because such an approach provides a final product having the look and feel of the conventional wax sealing ring intended to be replaced.

Accordingly, it is desirable when formulating particular embodiments of the inventive wax based composition to select a filler, or combinations or fillers, which in the aggregate exhibit a density of about 0.4-1.3 g/cc, more typically, 0.6-1.1 g/cc, or even 0.7-1.0 g/cc. In this regard, see the following working Examples 1-7, 9, 10 and 13, which use a filler package composed of 7 wt. % SilCell (density≈0.14 g/cc) and 40 wt. % calcium carbonate (density=2.71 g/cc), the percents being based on the weight of the composition as a whole. The combined density of this filler package, as a whole, is about 0.73 g/cc, slightly less than that of the slack wax used to form this composition (density≈0.9 g/cc).

It is also desirable when selecting fillers to chose those with relatively low cost, as this minimizes the manufacturing costs of the final product obtained. Accordingly, most wax based compositions made in accordance with this invention will include a combination of high density filler and low density filler, since this approach enables the cost of the fillers to be minimized while still providing a filler package exhibiting the desired density, as a whole.

So, for example, preferred wax based compositions of this invention contain at least about 20 wt. % high density filler such as calcium carbonate, bentonite, precipitated silica and mica and Claytone 40, since these fillers are some of the least expensive fillers commonly available. Concentrations of high density fillers on the order of about 20-60 wt. %, 30-50 wt. % or even 35-45 wt. %, are more typical. In addition to reducing cost, these high density fillers also serve to increase hardness, generally speaking. Therefore, the amount of high density filler used should not be so much that the hardness of the ultimate product is too great or too little, respectively.

Since the densities of these particular high density fillers will normally be ~2.3 to ~3.0 g/cc, an appropriate amount of one or more of the low density fillers mentioned above is also included wax compositions formed from these high density fillers in order to achieve the desired overall density of the filler package as a whole. For example, hollow microspheres or other low density fillers having densities on the order of 0.1 to 0.18 g/cc are often used to achieve this desired density. If so, the amount of such low density fillers used will be at least about 3 wt. %, typically be on the order of 3-12 wt. %, more typically 5-10 wt. % or even 6-8 wt. %, based on the weight of the wax based composition as a whole.

Thus, the ratio of high density filler to low density filler will normally be on the order of about 10:1 to 3:1, more typically about 8:1 to 4:1, or even about 7:1 to 5:1 on a weight basis. Although this implies that the amount of high density filler is much more than the amount of low density filler, this is so only on a weight basis. On a volume basis, the amount of high density filler is usually much less than the amount of low density filler, because of the much lower density of the low density filler. So, for example, in the filler package of the following Examples 1-7, 9, 10 and 13 mentioned above, the weight ratio of high density to low density fillers is 40/7, but volume ratio of these same fillers is 14.7/50. So on a volume basis, the ratio of high density filler to low density filler will normally be on the order of about 0.075:1 to 0.6:1, more typically about 0.1:1 to 0.5:1, or even about 0.2:1 to 0.4:1. While these low density fillers may appear to be more expensive, and indeed are more expensive on a weight basis, they are still relatively inexpensive on a usage basis, because such a comparatively small amount is used.

The shape of the particulate filler is not critical, and particulates of essentially any shape can used. For example, essentially spherical particles such as silica sand exhibiting an angle of repose of at least about 27 or even at least about 30 can be used. Alternatively, particulate fillers in the form of fibers having length/diameter ratios of up to 1000 or more can be used, although length/diameter ratios of up to about 750, up to about 500, or up to about 250, are more common. Similarly, naturally occurring minerals which are platelet in form can also be used. Indeed, the preferred naturally occurring high density filler, calcium carbonate, is platelet in form. Aspect ratios in such materials of up to about 100 are not uncommon, with aspect ratios of up to about 50, or even up to about 25, being more common.

The particle size of the particulate filler is also not critical, and essentially any particle size can be used so long as the wax based compositions of this invention retains the desired degree of flexibility and elasticity, as mentioned above. To this end, the average particle size of the particulate filler in its smallest dimension is preferably about 1-10 microns, 2-8 microns, more typically, 3-7 microns or even 4-6 microns.

Properties

The inventive toilet sealing ring, at least in preferred embodiments of this invention, is desirably formulated to perform as well as conventional toilet sealing rings. Therefore, in formulating preferred embodiments of the wax based composition of this invention, it is desirable to select its individual ingredients so that this wax composition, once solidified, exhibits a Softening Point of about 50° C. to 90° C., a hardness of about 60 to 150 (measured using a Humboldt needle no. H-1310), and passes the Elasticity test outlined in the Test Standard TT-P-1536 A. Preferably, the wax composition exhibits a Softening Point of about 60° C. to 80° C., or even 68° C. to 74° C., a density of about 0.6-1.1 g/cc, or even 0.7-1.0 g/cc, and a hardness of about 75 to 135, or even 85 to 120.

Manufacture

The inventive toilet sealing ring is made by mixing all of ingredients together of the inventive wax based composition at or above the melting temperature of its wax ingredient until a homogeneous mixture is formed, charging the mixture so formed into a suitable mold, and then allowing the mixture to solidify into a product toilet sealing ring. This is most easily done by blending the wax ingredient, the hydrocarbon oil and synthetic wax together at or above the melting temperature of its wax ingredient until a homogeneous mixture is formed and then adding the fillers to the result molten wax mixture, with stirring, until a homogenous composition is formed.

WORKING EXAMPLES

In order to more thoroughly describe this invention, the following working examples are provided. In these examples, numerous wax based compositions were prepared from a variety of different waxes, and the properties of the compositions so obtained, after solidification, were determined.

These compositions were made by the general procedure noted above, i.e., the fillers were added to a previously formed homogeneous molten mixture of the wax, hydrocarbon oil and the synthetic wax, after which the composition so formed was further mixed until homogenous and then charged into a suitable mold for solidification. Unless otherwise indicated, all weight percents refer to the weight of the indicated ingredient based on the weight of the product wax based composition as a whole.

Example 1

40 wt. % of S9451 slack wax available from Sasol Wax of Richmond, Calif. having a Drop melt temperature of 68 to 74° C. and a density of 0.9 g/cc was combined with 10 wt. % of L-100 naphthenic oil, which is a severely hydrotreated premium quality naphthenic base oil exhibiting a light color, good stability and a viscosity at 100° F. (37.8° C.) of 104.6 SUS available from Cross Oil Refining & Marketing, Inc. of Smackover, Ark., in a mixing vessel and the mixture so obtained heated with mixing to 74° C. until the wax melted and the oil homogeneously distributed in the molten wax.

3 wt. % of Marcus LDPE wax having a density of 0.85 g/cc, a Drop melt point of 83° C., and number average molecular weight of about 600 to 1500 available from Marcus Oil and Chemicals of Houston, Tex., was then added, and mixing continued until the polyethylene wax melted and was homogenously distributed in the composition.

Thereafter, 40 wt. % of Huber Q6 calcium carbonate having an aspect ratio of 1:1 to 1:2 and an average particle size of 6 microns available from J. M. Huber, of Quincy, Ill. and 7 wt. % of Sil-42 glass micro cellular low density filler having an average dry bulk density of 0.14 g/cc available from Silbrico Corporation of Hodgkins, Ill., were added. The composition so obtained was then continuously stirred for an additional 30 minutes, while the temperature of the composition was maintained at about 70-85° C., until a homogenous mixture was obtained. At that time, mixing was stopped and the mixture immediately poured into a mold and allowed to solidify and cool to room temperature.

The solidified composition so obtained was then analyzed and found to exhibit a Softening Point of 154° F. (68° C.), a density of 7.8 lbs/gal (0.93 g/cc), a hardness of 91, as measured using a Humboldt needle no. H-1310. In addition, the solidified composition and passed the elasticity test outlined in the Test Standard TT-P-1536 A.

Comparative Example A

For comparative purposes, a molded article of the same shape was made from 100 wt. % S9451 slack wax and tested in the same way as the product of Example 1. The product obtained was found to exhibit a Softening Point of 158° F. (70° C.), a density of 7.8 lbs/gal (0.93 g/cc), and a hardness of 98, as measured using a Humboldt needle no. H-1310. In addition, the product also passed the elasticity test outlined in the Test Standard TT-P-1536 A.

Examples 2-13 and Comparative Example B

Example 1 and comparative Example A were repeated using different waxes, hydrocarbon oils and amounts of LDPE, and the molded articles produced from each composition were tested in the same way as Example 1 and comparative Example A. Like Example 1, Examples 2-10 were carried out in accordance with the preferred embodiment of this invention in which the wax component of the inventive wax-based compositions was formulated to have a Drop Melt Point of about 50° C. to 125° C., when measured by ASTM D127, and a hardness of about 40 to 100, when measured by the Cone Penetration Test of ASTM D937.

The composition of each example and comparative is set forth in the following Table 1, while the results obtained are set forth in the following Table 2.

In Table 1, the following abbreviations refer to the following products:

S9451—slack wax available from Sasol Wax of Richmond, Calif. having a Drop melt temperature of 68° C. to 74° C. and a density of 0.9 g/cc MR7440—slack wax available from Masterbank America Inc. of Newport Beach, Ca., which exhibits a Drop Melt Point (ASTM D 127) of about _° F. (_° C.), a Congeal Point (ASTM D 938) of about _° F. (_° C.), a Cone Penetration at 77° F. (25° C.) (ASTM D 937) of about _, and a viscosity at 100° C. (ASTM D 445) of about _ cSt.

MR5844H2—slack wax available from Masterbank America Inc. of Newport Beach, Ca., which exhibits a Drop Melt Point (ASTM D 127) of about 161.5° F. (71.9° C.), a Congeal Point (ASTM D 938) of about 144.5° F. (62.5° C.), a Cone Penetration at 77° F. (25° C.) (ASTM D 937) of about 80, and a viscosity at 100° C. (ASTM D 445) of about 15.9 cSt.

Sylvaras RE40—Rosin Ester available from Arizona Chemical company of Jacksonville, Fla., which exhibits a Ring and Ball Softening Point of 30° C. to 40° C.

Sylvaras TP95—Terpene Phenolic Resin available from Arizona Chemical company of Jacksonville, Fla., which exhibits a ring and ball Softening Point of 92° C. to 98° C.

L-100—Naphthenic Oil available from Cross Oil Refining and Marketing, Inc. of Smackover, Ark IGI-205A—waxy oil comprising a mixture of soft petroleum waxes and hydrocarbon oil having a pore point of about 100° F. (37° C.) and a kinematic viscosity at 212° F. (100° C.) of about 6 cSt. available from The International Group IGI-211A—very soft microcrystalline foots oil having a pore point of about 80° F. (27° C.) and a kinematic viscosity at 212° F. (100° C.) of about 22 cSt. also available from The International Group.

RPO—Naphthenic Oil available from R. E. Carroll of Trenton, N.J.

Sil 42—hollow glass microspheres having a density of about 0.14 g/cc available from Silbrico of Hodgkins, Ill.

Qccl—hollow microspheres having dry bulk density of 0.24 g/cc (about 15 lbs/ft.$^3$) available from Potters Industries Inc, Malvern, Pa.,

TABLE 1

Formulations of Examples 1-10 and Comparative Examples A-E

| Ex | Wax Type | Wax Amt | HC Oil Type | HC Oil Amt | LDPE Amt | HD Filler Type | HD Filler Amt | LD Filler Type | LD Filler Amt |
|---|---|---|---|---|---|---|---|---|---|
| 1 | S9451 | 40 | L-100 | 10 | 3 | CaCO$_3$ | 40 | Sil 42 | 7 |
| 2 | MR7440 | 25 | IGI-211A | 25 | 3 | CaCO$_3$ | 40 | Sil 42 | 7 |
| 3 | MR5844H2 | 30 | L-100 | 20 | 3 | CaCO$_3$ | 40 | Sil 42 | 7 |
| 4 | MR7440 | 35 | L-100 | 15 | 3 | CaCO$_3$ | 40 | Sil 42 | 7 |
| 5 | MR7440 | 30 | IGI-205A | 20 | 3 | CaCO$_3$ | 40 | Sil 42 | 7 |
| 6 | MR7440 | 30 | IGI-211A | 20 | 3 | CaCO$_3$ | 40 | Sil 42 | 7 |
| 7 | S9451 | 40 | RPO | 10 | 3 | CaCO$_3$ | 40 | Sil 42 | 7 |
| 8 | S9451 | 80 | | | | | | Qcel | 20 |
| 9 | S9451 Sylvaras RE40 | 35 5 | L-100 | 10 | 3 | CaCO$_3$ | 40 | Sil 42 | 7 |
| 10 | S9451 Sylvaras TP95 | 35 5 | L-100 | 10 | 3 | CaCO$_3$ | 40 | Sil 42 | 7 |
| A | S9451 | 100 | — | — | — | — | — | — | — |
| B | MR5844H2 | 100 | — | — | — | — | — | — | — |
| 11 | S9451 Ground rubber | 80 10 | — | — | — | — | — | Sil 42 | 10 |
| 12 | S9451 | 40 | RPO | 5 | — | CaCO$_3$ | 45 | Sil 42 | 10 |
| 13 | MR7440 | 40 | L-100 | 10 | 3 | CaCO$_3$ | 40 | Sil 42 | 7 |

TABLE 2

Results Obtained from Examples 1-10 and Comparative Examples A-E

| Ex | Humboldt Needle Penetration (dm) | Pass Elasticity Test (Yes/No) | Softening Point ° F. | Density lbs/gal |
|---|---|---|---|---|
| 1 | 91 | Y | 154 | 7.8 |
| 2 | 124 | Y | 162 | 8.0 |
| 3 | 142 | Y | 158 | 8.3 |
| 4 | 115 | Y | 146 | 8.3 |
| 5 | 84 | Y | 156 | 8.1 |
| 6 | 79 | Y | 162 | 8.1 |
| 7 | 90 | Y | 158 | 7.9 |
| 8 | 114 | Y | 154 | 6.0 |
| 9 | 114 | Y | 146 | 8.3 |
| 10 | 111 | Y | 152 | 8.3 |
| A | 98 | Y | 158 | 7.5 |
| B | 100 | Y | 161.5 | 7.4 |
| 11 | 54 | N | 162 | 6.0 |
| 12 | 44 | N | 163 | 9.0 |
| 13 | 66 | N | 156 | 8.5 |

As can be seen from Examples 1-10 and Comparative Examples A and B, wax-based compositions formulated in accordance with the preferred embodiment of this invention in which the wax component exhibits a Drop Melt Point of about 50° C. to 125° C. and a hardness of about 40 to 100 exhibit a softening point, hardness, elasticity and density essentially the same as the slack waxes traditionally used to make toilet bowl sealing rings, even though they contain almost 50 wt. % inert filler. Meanwhile, Examples 11-13 show that similar compositions made with the same slack waxes (S9451 and MR7440) containing as little as 20 wt. % inert fillers, although exhibiting generally acceptable softening points, densities and hardness's (as measured by the Humboldt Needle Penetration test), achieve a less desirable elasticity and in some instances a less desirable hardness, because they contain insufficient or no hydrocarbon oil or other softer hydrocarbon. This shows the desirability of formulating the wax component of the inventive wax-based compositions to have a Drop Melt Point of about 50° C. to 125° C., when measured by ASTM D127, and a hardness of about 40 to 100, when measured by the Cone Penetration Test of ASTM D937, in accordance with the preferred embodiment of this invention, as indicated above.

In other words, the above examples and comparative examples show that, in order to obtain wax/filler compositions which not only contain significant amounts of non-wax filler but which also exhibit the softening point, elasticity, flexibility, cohesiveness and adhesiveness of waxes traditionally used to make conventional toilet sealing rings, it is necessary to modify these conventional waxes in the manner described above to produce new waxy binders which are softer and more elastic than these conventional waxes. Based on the above disclosure and working examples, those skilled in the art should have no difficulty in formulating specific wax-based compositions which still exhibit the combination of properties necessary to function as effective toilet sealing rings while also containing substantial amounts of inert fillers, and hence substantially reduced amounts of slack wax.

Although only a few embodiments of this invention have been described above, it should be appreciated that many modifications can be made without departing from the spirit and scope of the invention. All such modifications are intended to be include within the scope of this invention, which is to be limited only by the following claims:

The invention claimed is:

1. A toilet sealing ring comprising:
    an annular mass of a wax based composition comprising:
        a wax component and at least 20 wt. % of a non-wax filler component, wherein the filler component comprises at least about 20 wt. % of a high density filler having a density of at least about 1.5 g/cc, and at least about 3 wt. % of a low density filler having a density of no more than about 0.6 g/cc, the percents being based on the weight of the wax based composition as a whole.

2. The toilet sealing ring of claim 1, wherein the wax based composition contains about 20 to 70 wt. % of a wax component, said wax component including about 1 to 6 wt. % of a low density synthetic wax formed by polymerizing or copolymerizing at least one of ethylene, propylene, n-butylene and iso-butylene.

3. The toilet sealing ring of claim 2, wherein the low density synthetic wax has a density of about 0.5 to 1.2 gm/cc.

4. The toilet sealing ring of claim 1, wherein the ratio of high density filler to low density filler is about 10:1 to 3:1 on a weight basis and about 0.075:1 to 0.6:1 on a volume basis.

5. The toilet sealing ring of claim 4, wherein the high density filler comprises calcium carbonate and the low density filler comprises hollow microspheres.

6. The toilet sealing ring of claim 1,
    wherein the wax component exhibits a Drop Melt Point of about 45° C. to 125° C., when measured by ASTM D127, and a hardness of about 40 to 100, when measured by the Cone Penetration Test of ASTM D937, and
    wherein the amount of wax component in the wax based composition is sufficient so that the wax based composition, as a whole, exhibits a Softening Point of about 50° C. to 90° C., a hardness of about 60 to 150 when measured using a Humboldt needle no. H-1310, and passes the Elasticity test outlined in the Test Standard TT-P-1536 A.

7. The toilet sealing ring of claim 6, wherein the wax component comprises
    a hard wax having a hardness of 70 or more when measured by the Cone Penetration Test of ASTM D937,
    one or more hydrocarbon ingredients comprising a soft wax having a hardness of less than 70 when measured by the Cone Penetration Test of ASTM D937, a hydrocarbon oil, or both, and
    an optional low density synthetic wax made by polymerizing or copolymerizing at least one of ethylene, propylene, n-butylene and iso-butylene, the optional low density synthetic wax having a density of about 0.5 to 1.2 gm/cc.

8. The toilet sealing ring of claim 7, wherein the hydrocarbon ingredient comprises one or more of a hydrocarbon wax and hydrocarbon oil.

9. The toilet sealing ring of claim 7, wherein said hydrocarbon oil has a viscosity of about 4 to 400 cSt at 100° F. (37.8° C.), a specific gravity of about 0.8 to 0.95 g/cc at 15.6° C. and an Aniline Point of 60° C. to 100° C.

10. The toilet sealing ring of claim 7, wherein the wax component exhibits a Drop Melt Point of about 55° C. to 85° C., and a hardness of about 45 to 85.

11. The toilet sealing ring of claim 7, wherein the filler component exhibits a density of about 0.4-1.3 g/cc.

12. The toilet sealing ring of claim 11, wherein the filler component exhibits a density of about 0.6-1.1 g/cc.

13. The toilet sealing ring of claim 7, wherein the wax component comprises a slack wax having a Drop Melt point of about 130 to 200° F. (54.5 to 93.3° C.) and a Cone Penetration of about 40-90 dmm in combination with a hydrocarbon oil having a viscosity of about 10 to 1,500 cSt at 100° F. (37.8° C.), a specific gravity of about 5 to 40 lbs/gal. (0.6 to 4.8 g/cc) at 60° F. (15.6° C.) and an aniline point of about 140 to 240° F. (60 to 115.6° C.).

14. The toilet sealing ring of claim 13, wherein the wax component comprises a slack wax having a Drop Melt point of about 155-175° F. (54.5 to 93.3° C.) and a Cone Penetration of about 55-70 dmm in combination with a hydrocarbon oil having a viscosity of about 20 to 1,000 cSt at 100° F. (37.8° C.), a specific gravity of about 15 to 25 lbs/gal. (1.8 to 3.0 g/cc) at 60° F. (15.6° C.) and an aniline point of about 160-200° F. (71.1 to 93.3° C.).

15. The toilet sealing ring of claim 13, wherein the filler component exhibits a density of about 0.7-1.0 g/cc.

16. The toilet sealing ring of claim 15, wherein the ratio of high density filler to low density filler is about 10:1 to 3:1 on a weight basis and about 0.075:1 to 0.6:1 on a volume basis.

17. The toilet sealing ring of claim 13, wherein the high density filler comprises calcium carbonate and low density filler comprises hollow microspheres.

18. The toilet sealing ring of claim 17, wherein the wax component includes about 1 to 6 wt. % low density synthetic wax made by polymerizing or copolymerizing at least one of ethylene, propylene, n-butylene and iso-butylene, the optional low density synthetic wax having a density of about 0.5 to 1.2 gm/cc.

19. The toilet sealing ring of claim 8, wherein the high density filler comprises calcium carbonate and the low density filler comprises hollow microspheres, and further wherein the wax component includes about 1 to 6 wt. % low density synthetic wax made by polymerizing or copolymerizing at least one of ethylene, propylene, n-butylene and iso-butylene, the optional low density synthetic wax having a density of about 0.5 to 1.2 gm/cc.

20. The toilet sealing ring of claim 7, wherein the high density filler comprises calcium carbonate and the low density filler comprises hollow microspheres, and further wherein the wax component includes about 1 to 6 wt. % low density synthetic wax made by polymerizing or copolymerizing at least one of ethylene, propylene, n-butylene and iso-butylene, the optional low density synthetic wax having a density of about 0.5 to 1.2 gm/cc.

21. A wax based composition for making a toilet sealing ring, the composition comprising:
    at least about 20 wt. % of a high density filler having a density of at least about 1.5 g/cc, at least about 3 wt. % of a low density filler having a density of no more than about 0.6 g/cc, and
    a sufficient amount of a wax component so that the wax based composition as a whole exhibits a Softening Point of about 60° C. to 90° C., a hardness of about 60 to 150

(measured using a Humboldt needle no. H-1310), and passes an Elasticity test as outlined in the Test Standard TT-P-1536 A.

22. The wax based composition of claim 21, wherein the wax component exhibits a Drop Melt Point of about 45° C. to 125° C., when measured by ASTM D127, and a hardness of about 40 to 100, when measured by the Cone Penetration Test of ASTM D937.

23. The wax based composition of claim 22, wherein the wax based composition contains about 20 to 70 wt. % wax component, and further wherein the wax component includes about 1 to 6 wt. % low density synthetic wax made by polymerizing or copolymerizing at least one of ethylene, propylene, n-butylene and iso-butylene, the optional low density synthetic wax having a density of about 0.5 to 1.2 gm/cc, the percents being based on the weight of the wax based composition as a whole.

\* \* \* \* \*